United States Patent [19]
Hill

[11] Patent Number: 5,845,920
[45] Date of Patent: Dec. 8, 1998

[54] APPARATUS FOR TOWING A DISABLED TRUCK TRACTOR

[76] Inventor: John Clyde Hill, P. O. Box 1495, Moncks Corner, S.C. 29461-1495

[21] Appl. No.: 576,757

[22] Filed: Dec. 21, 1995

[51] Int. Cl.⁶ ............................................. B60P 3/06
[52] U.S. Cl. ............................................. 280/402; 414/563
[58] Field of Search ..................... 280/402, 492, 280/493; 414/563, 642, 665, 667, 917

[56] References Cited

U.S. PATENT DOCUMENTS

| | | | |
|---|---|---|---|
| 2,481,223 | 9/1949 | Johnson | 414/563 |
| 2,515,833 | 7/1950 | Mueller | 414/563 |
| 2,593,764 | 4/1952 | Kaunitz, Jr. | 414/563 |
| 3,715,042 | 2/1973 | Rellinger | 414/563 |
| 4,047,733 | 9/1977 | Parkes | 280/402 |
| 4,149,643 | 4/1979 | Skala et al. | 414/563 |
| 4,544,175 | 10/1985 | Hubert | 280/402 |
| 4,555,214 | 11/1985 | Morton | 280/402 X |
| 4,708,358 | 11/1987 | Gehman et al. | 280/402 |
| 4,838,753 | 6/1989 | Gehman et al. | 414/563 |
| 5,163,803 | 11/1992 | Marola | 280/402 X |
| 5,249,911 | 10/1993 | Marola | 280/402 X |

*Primary Examiner*—Kevin Hurley
*Attorney, Agent, or Firm*—Norman B. Rainer

[57] ABSTRACT

A towing apparatus removably attachable to the fifth wheel of a towing vehicle includes a forward lifting beam having a distal extremity and a proximal extremity having a flat mounting face angularly disposed to the long axis of the beam and adapted to engage the fifth wheel. A rear lifting beam has a first extremity pivotably joined to the distal extremity of the forward lifting beam, and a second extremity attachable to the fifth wheel of a disabled tractor. A hydraulically activated piston, located in the forward lifting beam causes movement of the rear lifting in a vertical plane.

12 Claims, 5 Drawing Sheets

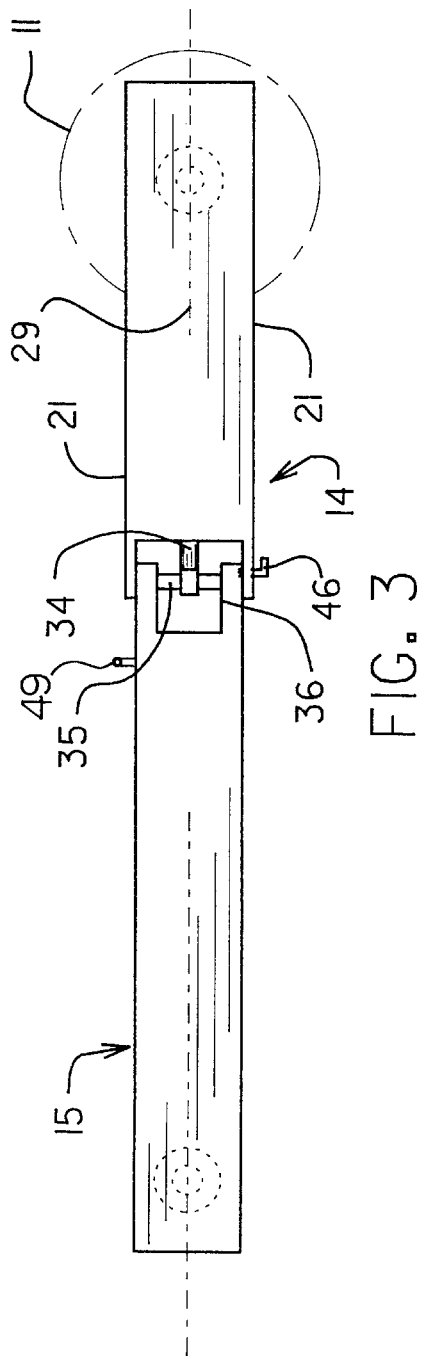
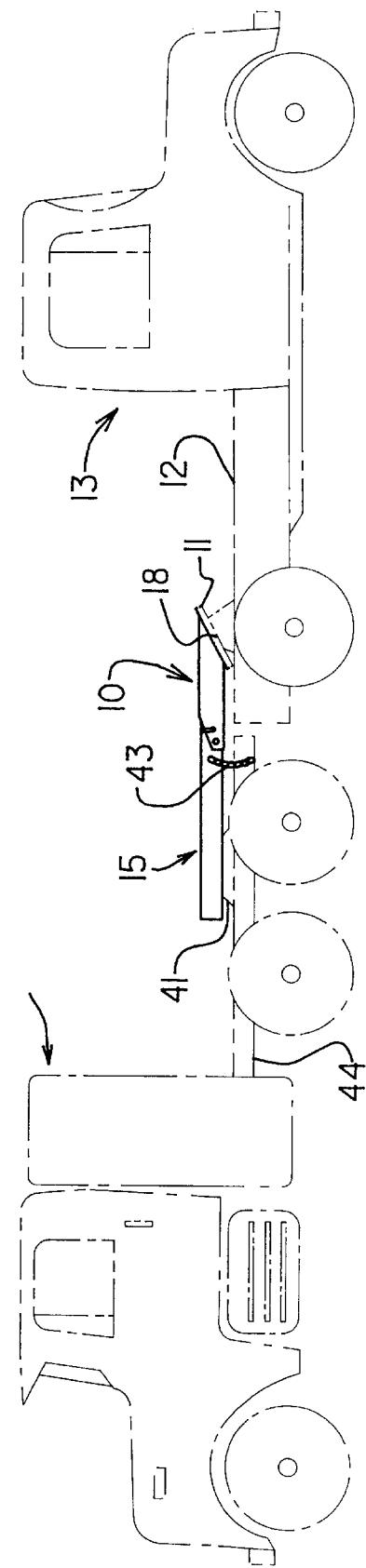

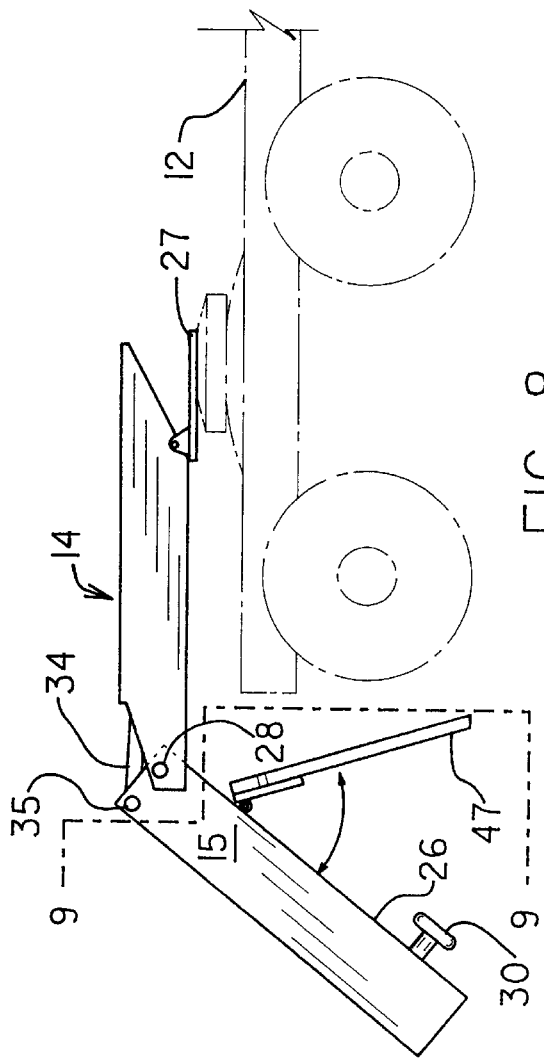
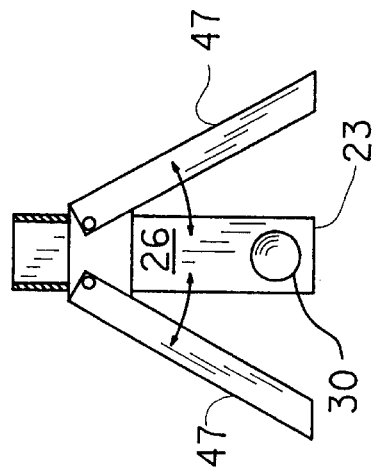
FIG. 8
FIG. 9
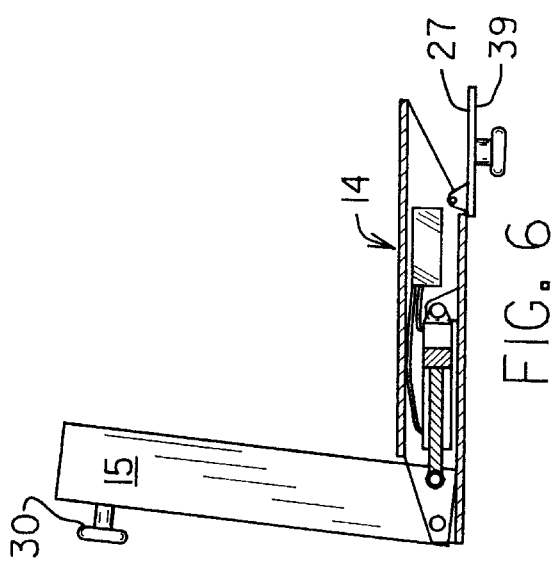
FIG. 6
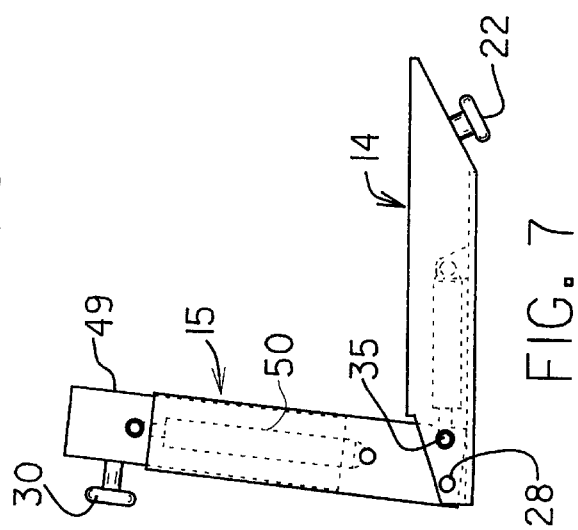
FIG. 7

APPARATUS FOR TOWING A DISABLED TRUCK TRACTOR

BACKGROUND OF THE INVENTION

1. Field of the Invention

The present invention relates generally to transporting disabled vehicles and, more particularly, is concerned with a recovery unit for hitching a disabled truck tractor to a towing truck tractor in a manner comparable to normal tractor trailer operations.

2. Description of the Prior Art

In view of the extensive use of truck tractor and trailer rigs in transporting the bulk of goods and freight over the nation's highways, it is to be expected that tractor breakdown will be a frequent occurrence. Typically, a disabled tractor has to be removed from the highway to a service facility in order for repairs to be made. Removal normally requires towing the disabled tractor by using a large tow truck specially equipped and dedicated for that purpose. Such tow trucks are expensive, costing in excess of $100,000, and entail high operating costs. In many areas of the country, there are either none available or there may be considerable delay in obtaining the services of one when a breakdown occurs.

There has earlier been disclosed the desirability of temporarily adopting an ordinary truck tractor to perform such towing tasks in addition to its normal use as part of a tractor and trailer rig. The objective is to eliminate the need to locate a dedicated tow truck in order to remove a disabled tractor from the highway to a service facility. The advantage in being able to use another tractor is that such tractors are found with much greater frequency in all parts of the country than are dedicated tow trucks, and thus one would quite likely be quickly and conveniently available where the need might arise. Representative hoist and towing mechanisms devised for this purpose are disclosed in U.S. Pat. Nos. 4,047,773 to Parks; U.S. Pat. No. 4,544,175 to Hubert and U.S. Pat. No. 4,708,358 to Gehman, et. al.

The mechanisms disclosed in the aforesaid patents recognize the advantage of employing the fifth wheels on both the towing and towed tractors to achieve a secure coupling of the two vehicles. Such coupling with the fifth wheel has been recognized to impart pivotal mobility necessary for maneuverability of the coupled vehicles during travel. However, the mechanisms of the aforesaid Patents do not readily permit unrestricted pivotal movement at the fifth wheel of the tow tractor. Unrestricted turning movement of a typical fifth wheel is achievable only when said wheel is in a level position, otherwise, binding of rotational movement is experienced. None of the aforesaid patent disclosures are cognizant of this important factor. Additionally, any secondary fulcrum or point of support on the tow tractor other than its fifth wheel inhibits maneuverability.

Earlier towing devices are difficult to deploy for use, often involving the need to carefully position beams or assemblies that may weight as much as 500 pounds. Another requirement of an effective tow device is compactness of storage upon the towing vehicle.

Once the towing tractor is coupled to the disabled tractor, it is necessary to lift the rear portion of the disabled tractor so that it can be pulled in a rearwardly directed manner, riding only upon the front wheels. Such lifting is a formidable task because a tractor may weigh between 15,000 and 20,000 pounds, and a force of about 8,000 pounds is required to raise the rear end of the tractor so that only its front wheels ride on the ground. The aforesaid Gehman, et. al. patent discloses the use of three hydraulic cylinders within a complex framework system to achieve the lifting function. The cylinders must be activated alternatively in a precise order to unfold the unit, and again to lift the tractor. Most of the lifted weight rests upon a fulcrum located behind the rearmost wheels of a tandem axle towing tractor. The placement of excessive weight behind the rear axle or the centerline of tandem rear axles of the towing tractor is undesirable because it lightens the load on the front steering axle of the tractor, thereby causing problems with steering, braking and legal weights per axle. It should also be noted that, in the aforesaid patents, the towing vehicle is of comparable size and weight as the disabled tractor. It would be desirable to utilize a smaller, less expensive towing vehicle to accomplish the lifting and towing mission.

It is accordingly an object of the present invention to provide apparatus for enabling a vehicle having a fifth wheel to tow a disabled tractor vehicle, also having a fifth wheel.

It is another object of this invention to provide apparatus as in the foregoing object which lifts the rear of said disabled vehicle for transporting it rearwardly while rolling on its front wheels.

It is a further object of the present invention to provide apparatus of the aforesaid nature wherein all the lifted weight of said disabled vehicle is borne by the fifth wheel of said towing vehicle.

It is yet another object of this invention to provide apparatus of the aforesaid nature which couples said towing and disabled vehicles by way of their fifth wheels.

It is a still further object of the present invention to provide apparatus of the aforesaid nature which permits jackknifing of said coupled vehicles in a small turning radius.

It is an additional object of this invention to provide apparatus of the aforesaid nature of simple construction amenable to easy, safe operation and low cost manufacture.

These objects and other objects and advantages of the invention will be apparent from the following description.

SUMMARY OF THE INVENTION

The above and other beneficial objects and advantages are accomplished in accordance with the present invention by apparatus removably attachable to the fifth wheel of a towing vehicle, said apparatus comprising:

a) a forward lifting beam elongated between proximal and distal extremities, said proximal extremity having a flat mounting face angularly disposed with respect to the direction of said elongation and having a downwardly directed first coupling fixture, b) a rear lifting beam elongated between first and second extremities, and having upper and lower surfaces, said first extremity being pivotally joined adjacent said lower surface to the distal extremity of said forward lifting beam, and said lower surface having adjacent said second extremity a downwardly directed second coupling fixture, and c) hydraulically activated piston means associated with said forward lifting beam and pivotally interactive with the first extremity of said rear lifting beam adjacent the upper surface thereof in a manner to effectuate powered pivotal movement of said rear lifting beam in a vertical plane.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 3 is a top view of the apparatus in its deployed state.

FIG. 4 illustrates the initial stage of deployment of the apparatus.

FIG. 6 is a side view of a first alternative embodiment of the apparatus.

FIG. 7 is a side view, partly in section, of a second alternative embodiment.

FIG. 8 is a side view of a third alternative of the apparatus.

FIG. 9 is a sectional view taken in the direction of the arrows upon line 9—9 of FIG. 8.

DESCRIPTION OF THE PREFERRED EMBODIMENT

Figure 1:
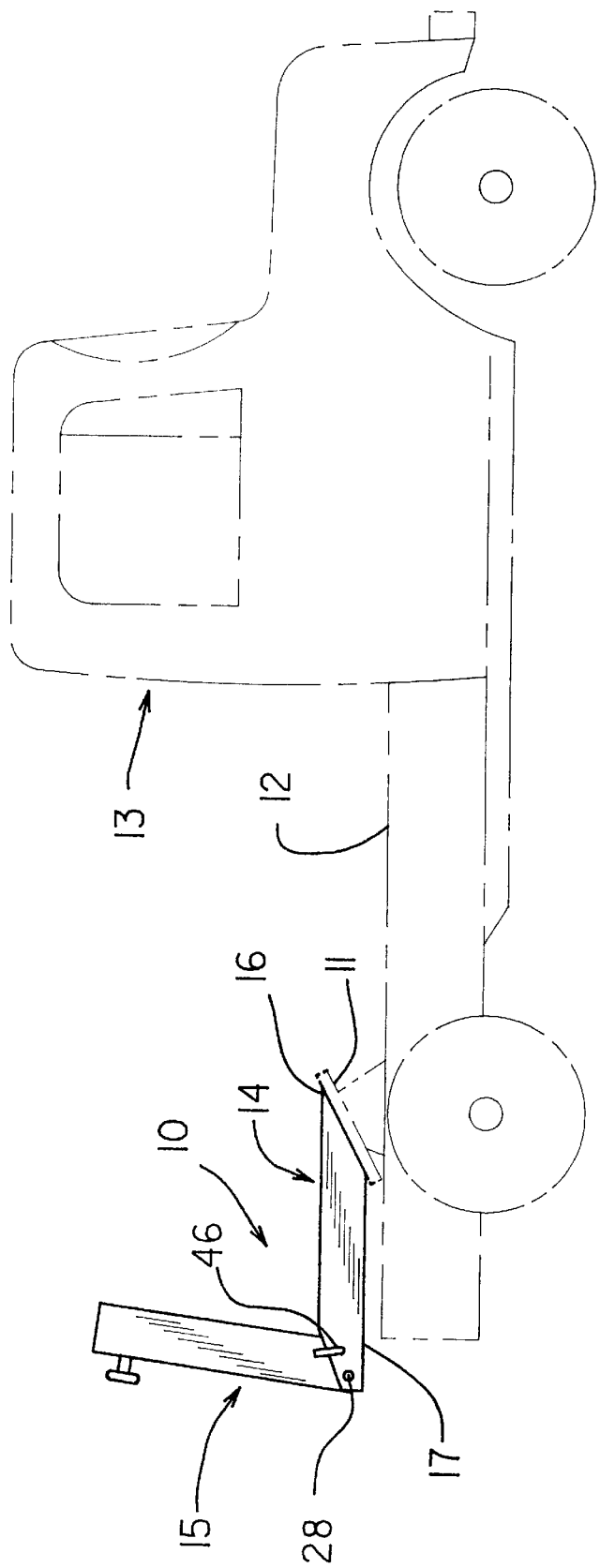
FIG. 1 is a side view of an embodiment of the towing apparatus of the present invention shown in its storage state in functional relationship with a towing vehicle.
Figure 2:
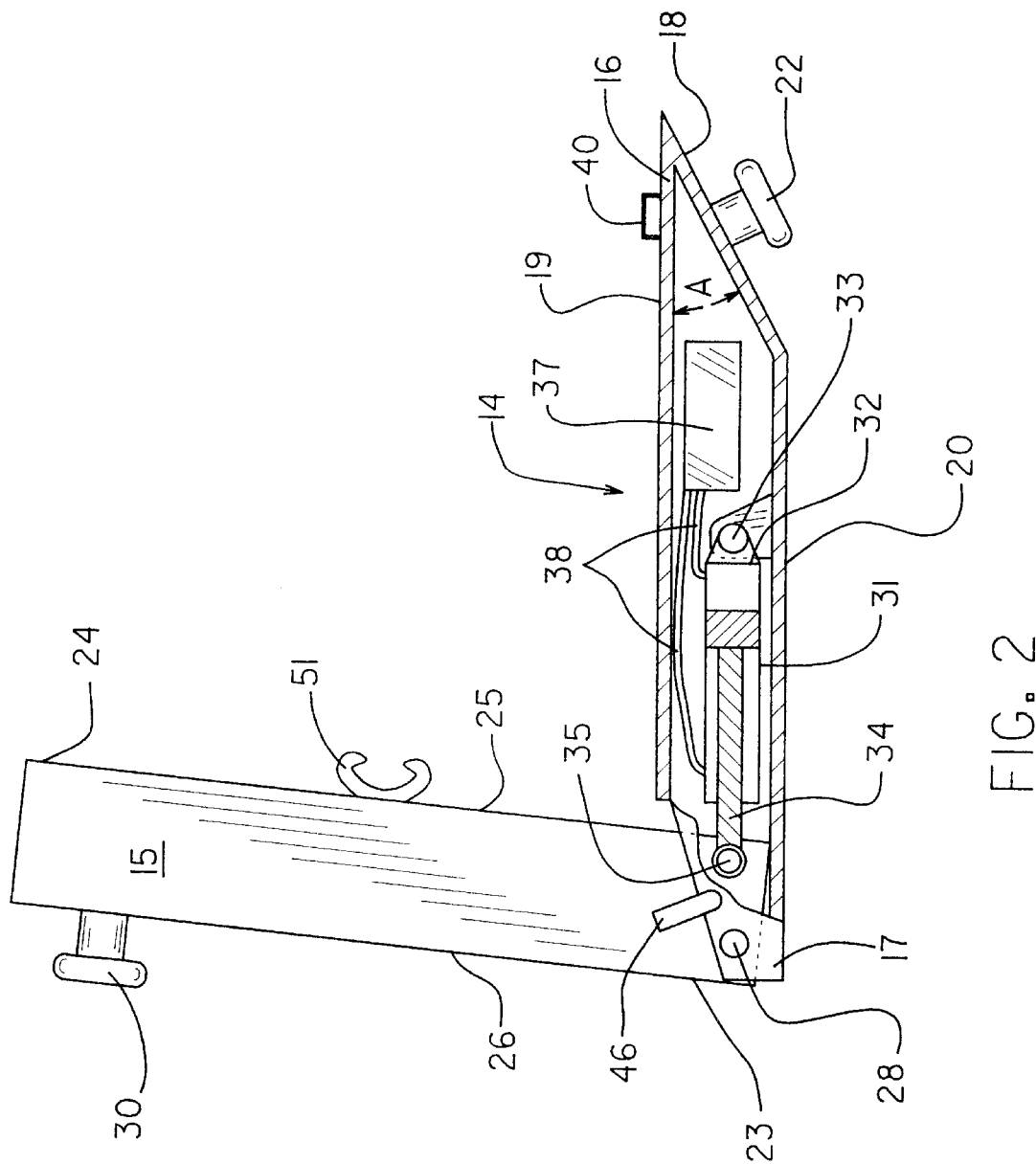
FIG. 2 is an enlarged view of the embodiment of FIG. 1 with portions broken away to reveal interior details.
Figure 5:
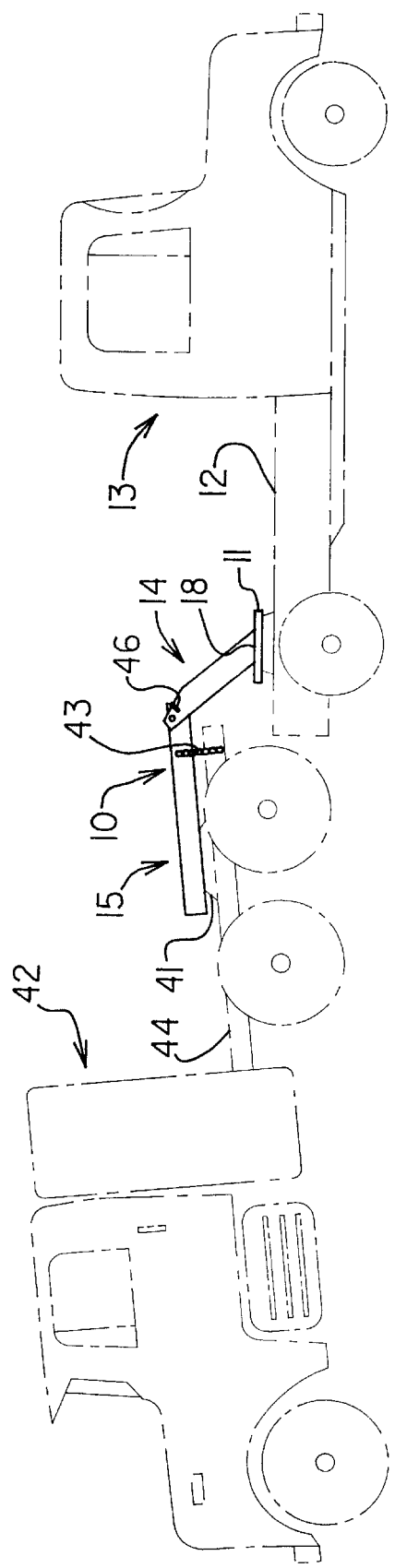
FIG. 5 illustrates the apparatus during towing.

Referring to FIGS. 1–5, an embodiment of the towing apparatus 10 of the present invention is shown mounted in a stored state upon a fifth wheel 11 disposed above the chassis frame 12 of a towing tractor vehicle 13.

Towing apparatus 10 is comprised of forward and rear lifting beams 14 and 15, respectively, said forward lifting beam being elongated between proximal and distal extremities 16 and 17, respectively. Proximal extremity 16 has a flat mounting face 18 disposed at an angle A with respect to the direction of elongation of said beam, said angle ranging between about 20 and 40 degrees.

Beam 14 is preferably of rectangular hollow tubular steel construction, although beams having other configurations may be employed. Accordingly, the exemplified embodiment of beam 14 may be further characterized as having upper and lower surfaces 19 and 20, respectively, and opposed side surfaces 21. Beam 14 may range in length from about 3½ to 4½ feet and may have a 12 inch square cross section. A downwardly directed first coupling fixture in the form of kingpin 22 is attached to mounting face 18. In the first alternative embodiment shown in FIG. 6, auxiliary mounting face 39 is provided by plate 27 pivoted to the proximal extremity of beam 14. The extent of motion of beam 14 with respect to plate 27 is limited by abutment of said plate against mounting face 18 and lower surface 20.

Rear lifting beam 15 is elongated between first and second extremities 23 and 24, respectively, and has upper and lower surfaces 25 and 26, respectively. Said first extremity is joined by way of first pivot bolt 28, located adjacent lower surface 26r to the distal extremity 17 of said forward lifting beam. In the exemplified embodiment, said distal extremity is shown to have a bifurcated configuration which embraces first extremity 23 for controlled pivotal movement. Such manner of construction also causes the apparatus to have a centered plane of symmetry represented by dashed line 29 in FIG. 3. A downwardly directed second coupling fixture in the form of kingpin 30 is attached to lower surface 26 adjacent second extremity 24. Rear lifting beam 15 is preferably longer than beam 14, and its length may be telescopically adjustable, as shown in FIG. 7, by way of internal member 49 slideably positionable by hydraulic cylinder 50.

A hydraulically activated cylinder 31 is mounted at its closed extremity 32 onto pivot means 33 secured within forward beam 14. A piston-driven shaft 34 axially emergent from the opposite extremity of cylinder 31 extends to joinder with rear beam 15 by way of second pivot bolt 35 located above first pivot. bolt 28 at the first extremity of beam 15. As shown more clearly in FIG. 3, pivot bolt 35 spans an axially centered slot 36 in said first extremity. Hydraulic fluid conduits 38 communicate between pump 37 and cylinder 31. An electrical receptacle 40 for serving said pump may be associated with upper surface 19.

In view of the specialized interaction of the aforesaid components, extension of shaft 34 in a single direction achieves both the lowering of beam 15 from its storage state and the lifting of the disabled vehicle.

The towing apparatus of this invention is attached by way of mounting face 18 or auxiliary mounting face 39 and associated kingpin of said forward beam to the fifth wheel of the towing vehicle. In the storage state of the apparatus, rear beam 15 is disposed in an upright position, as shown in FIG. 1.

In use, the towing vehicle is backed up to the rear of the disabled tractor vehicle. The hydraulic pump is activated to cause shaft 34 to move rearwardly, an action which lowers rear beam 15 to a position where second kingpin 30 can engage the fifth wheel 41 of disabled tractor vehicle 42. Such condition is illustrated in FIG. 4. One or more chains 43 are then passed beneath the frame 44 of the disabled vehicle and attached to rear beam 15. Chain-engaging hook means 49 may be associated with beam 15 to adjustably hold the chain. The nature of such securement by way of chain 43 is to cause beam 15 and fifth wheel 41 to be parallel to frame 44. Such manner of securement forms a rigid beam with respect to frame 44 and rear beam 15. Forward movement of shaft 34 is then continued, causing the lifting of beam 15 and the attached vehicle. Such lifting action is continued until the disabled vehicle is in a towing mode with only its front wheels resting upon the ground and mounting face 18 or auxiliary mounting face 39 is level with frame 12 of the towing vehicle 13. A holding peg 46 may be caused to penetrate forward and rear beams where they overlap in order to provide more assured position stability of the beams. When both vehicles are interconnected by the towing apparatus in the aforesaid manner, full jackknife turning ability is imparted to the coupled vehicles because the fifth wheel of the towing vehicle is able to rotate in its usual manner in a horizontal plane.

It should also be noted that the aforesaid coupling operation is achievable with simplicity and in safe manner. When the towing apparatus is not in use, it may be removed from the towing vehicle. in the alternative embodiment illustrated in FIGS. 8 and 9, fold-away legs 47 may be attached to the lower surface 26 of said rear beam. When legs 47 are deployed downwardly and outwardly, they provide an A-shaped support, whereby the towing apparatus will be self-standing in a parked state by virtue of resting upon legs 47 and the second extremity 23 of rear beam 15. The stability of such parked state is due to the fact that rear beam 15 is heavier than forward beam 14. It should also be noted that the pivoted joinder of the two beams includes abutments which limit the extent of pivotal movement of the beams. The limit of travel of the rear beam is about 30 degrees from horizontal in the downward direction, and about 100 degrees from horizontal in the upward direction.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. Towing apparatus removably attachable to the fifth wheel of a towing vehicle, and adapted to engage a disabled tractor having a fifth wheel, said apparatus comprising:
   a) a forward lifting beam elongated between proximal and distal extremities, said proximal extremity having a flat mounting face angularly disposed with respect to the direction of said elongation and having a downwardly directed first coupling fixture,
   b) a rear lifting beam elongated between first and second extremities, and having upper and lower surfaces, said first extremity being pivotally joined adjacent said lower surface to the distal extremity of said forward lifting beam, and said lower surface having adjacent said second extremity a downwardly directed second coupling fixture, and
   c) hydraulically activated piston means associated with said forward lifting beam and pivotally interactive with the first extremity of said rear lifting beam adjacent the upper surface thereof in a manner to effectuate powered pivotal movement of said rear lifting beam in a vertical plane.

2. The apparatus of claim 1 wherein said first coupling fixture is adapted to engage the fifth wheel of said towing vehicle, and said second coupling fixture is adapted to engage the fifth wheel of said disabled tractor.

3. The apparatus of claim 2 having a storage state wherein said rear lifting beam is in an upwardly directed disposition relative to said forward lifting beam.

4. The apparatus of claim 3 wherein said flat mounting face is disposed at an angle of between about 20 and 40 degrees with respect to the direction of elongation of said forward lifting beam.

5. The apparatus of claim 4 wherein said mounting face is pivotally associated with the proximal extremity of said forward lifting beam.

6. The apparatus of claim 3 having a vertical plane of symmetry.

7. The apparatus of claim 3 wherein said rear lifting beam is longer than said forward lifting beam.

8. The apparatus of claim 3 wherein the length of said lifting beam is telescopically adjustable.

9. The apparatus of claim 3 wherein said piston means, in a single direction of movement, achieves both the lowering of said rear lifting beam from its storage state and the lifting of said disabled tractor.

10. The apparatus of claim 3 wherein said rear lifting beam is provided with chain-holding means.

11. The apparatus of claim 3 wherein said rear lifting beam is provided with fold-away legs attached to said lower surface and adapted to be deployed downwardly and outwardly from said rear lifting beam to provide an A-shaped support enabling the apparatus to be self-standing when removed from said towing vehicle.

12. The apparatus of claim 3 wherein the pivoted joinder of said two beams includes abutment means which limit the extent of pivotal movement of said beams.

* * * * *